Oct. 27, 1953 H. A. BROOS 2,657,363

PHYSIOLOGICAL TONE CONTROL CIRCUIT

Filed July 12, 1949

INVENTOR.
HENRICUS ADRIANUS BROOS.
BY [signature]
AGENT.

Patented Oct. 27, 1953 2,657,363

UNITED STATES PATENT OFFICE 2,657,363

PHYSIOLOGICAL TONE CONTROL CIRCUIT

Henricus Adrianus Broos, Eindhoven, Netherlands, assignor to Hartford National Bank and Trust Company, Hartford, Conn., as trustee Application July 12, 1949, Serial No. 104,334
In the Netherlands August 7, 1948

3 Claims. (Cl. 333—70)

This invention relates to circuits for the so-called "physiological amplification" of low-frequency oscillations, for example, for use in the low-frequency amplifying part of a radio-receiver. The term "physiological amplification" means that the input circuit of the amplifying circuit comprises a gain control controlling the amplification factor, whereby at a low volume setting of the gain control, the low-tone frequencies are emphasized relatively to the intermediate tone frequencies (low-tone physiology), or the high-tone frequencies are emphasized relatively to the intermediate tone frequencies (high-tone physiology).

Low-tone physiology is usually obtained with the use of a gain control having a top contact, a bottom contact and also a third fixed contact, the part of the gain control between the third fixed contact and the bottom being shunted by a network which passes intermediate and high-tone frequencies.

High-tone physiology may, for example, be obtained by connecting the top of the gain control to the moving contact through a filter which passes high-tone frequencies. The disadvantage of a circuit having a low- and high-tone physiology combined in this manner is that the low-tone physiology is no longer varied when the moving contact of the gain control moves beyond the third fixed contact, whereas the high-tone physiology still continuously increases when the moving contact is moved downwards. For example, with the use of a fourth fixed contact and a second network which passes the intermediate and high tones, a slight amount of low-tone physiology may even be obtained beyond the third fixed contact, but this results in an unsatisfactory control which is not particularly smooth. It is also costly to manufacture a gain control having several tappings.

This invention has for its object to minimise the said disadvantage in a simple way. According to the invention, provision is made of not only the said low- and high-tone physiology but also of a connection between the moving contact of the gain control and a network which ensures low-tone physiology. More particularly, the connection bringing about the additional low-tone physiology may be provided by building up the network connected between the third contact and the bottom of the gain control from the series-connection of a resistance and a condenser, the junction of which is connected through a resistance to the moving contact of the gain control.

In order that the invention may be more clearly understood and readily carried into effect, two embodiments will now be described by way of example with reference to the accompanying drawing, of which:

Figure 1:
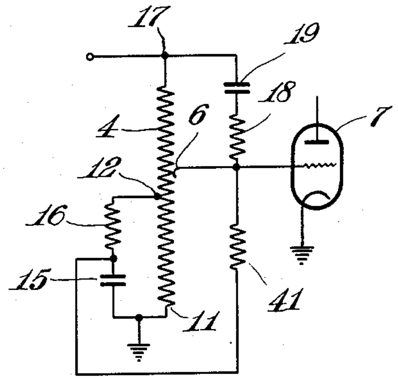
Fig. 1 shows a schematic diagram of one form.

In Fig. 1, an amplifying tube 7 is shown, the input circuit of which comprises a gain control 4 having two terminal contacts 11 and 17 and also a third fixed contact 12. The gain control 4 has supplied to it between the top 17 and the bottom 11 the oscillations to be amplified, the amplification of the circuit being controllable by a moving contact 6. The third fixed contact 12 and the bottom 11 of the gain control have connected between them a filter network which passes the intermediate and high-tone frequencies and provides the low-tone physiology. In the present example this consists of a series combination of a resistance and a capacity 15, 16. The high-tone physiology is provided by a network 18, 19 which only passes high-tone frequencies and which is connected between the top 17 and the moving contact 6 of the gain control.

If the moving contact 6 moves downwards, both the low and the high tones will be more and more emphasized relatively to the intermediate-tone frequencies. The disadvantage of a circuit comprising only the elements described so far, is that beyond the fixed contact 12 there is no further emphasis of the low tones, whereas the emphasis of the high tones still continuously increases. According to one form of the invention, an additional connection may be provided between the moving contact 6 and a network which ensures low-tone physiology. Such a network may, for example, consist of the series-combination of a resistance and a capacity, arranged in parallel with the gain control 4 and connected, for example, to the top 17 and the bottom 11 respectively.

According to the form of the invention shown in Figure 1, a very simple solution is found by connecting the junction of resistance 16 and condenser 15 of the network ensuring low-tone physiology through a resistance 41 to the moving contact 6.

Figure 2:
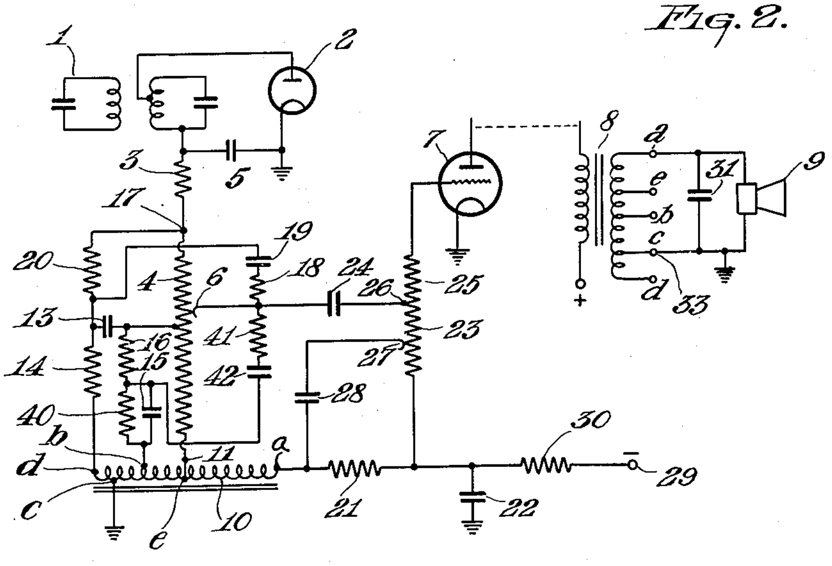
Fig. 2 shows a more elaborated form of the invention.

In the more elaborate circuit-arrangement shown in Fig. 2, in which the same reference numerals designate corresponding circuit elements to those of Fig. 1 of the accompanying drawings and of the drawing accompanying my co-pending patent application Serial No. 104,335, filed July 12, 1949, now Patent No. 2,591,915, issued April 8, 1952 the bottom of the gain control 4 is connected to a source of negative feedback voltage, constituted by a tap c—e of the secondary winding 10 of an output transformer 8 included in the output circuit of the discharge tube 7, the top 17 of the gain control being connected through impedances 14 and 20 to a source of positive feedback voltage, constituted by a tap c—d of the secondary winding 10. The resistances of gain control 4 and of impedances 14 and 20 are chosen to be such that substantially no negative feedback or only small negative feedback is operative at the top of gain control 4, whereas strong negative feedback is operative at the bottom of gain control 4. A so-called "loss-free" negative feedback of the circuit is thus ensured in known manner. Furthermore impedances 13, 14 are provided in combination with impedances 15, 16, so that strong negative feedback of the intermediate tone frequencies occurs at the level of the third fixed contact 12 of the gain control 4. The filter 18, 19 which ensures high-tone physiology is connected, for example, between the moving contact 6 and the junction of the resistances 14 and 20.

As described in my said copending U. S. patent application, the impedances 15, 16 may be shunted by a resistance 40 and be connected to a source of negative feedback voltage c—b, which is substantially of the same order of magnitude as the source of positive feedback voltage c—d. The source c—e of negative feedback voltage connected to the bottom 11 of gain control 4 is then larger than the source c—b, and the impedance between tap b and the third fixed contact 12 is chosen to be small with respect to the resistance of that part of the gain control 4 located between the third fixed contact 12 and the bottom 11. As described in the said copending application, these measures ensure a noiseless physiological control. It is here advisable to avoid, by the use of a blocking condenser 42, connected for example in series with resistance 41 or, if desired, in series with resistance 16, the flow of direct current through the circuit of the moving contact 6.

What I claim is:

1. A circuit arrangement for amplifying an input signal having high, medium and low frequency components, comprising an amplifier stage having an input circuit, and means to apply said signal to said input circuit and to vary the amplitude thereof, said means also varying the relative strength of said frequency components and comprising a potentiometer element having top, bottom and intermediate fixed contacts and a movable gain control contact, means to apply said signal between said top and bottom contacts, means to couple said movable contact and said bottom contact to said input circuit thereby to apply said signal to said input circuit, a first impedance network adapted to pass said high frequency components intercoupling said movable contact and one of said top and intermediate contacts thereby to emphasize said high frequency components with respect to said medium frequency components for positions of said movable gain control contact between said top and bottom contacts, a second impedance network adapted to by-pass said high and medium frequency components intercoupling said intermediate fixed contact and said bottom contact thereby to emphasize said low frequency components when said movable gain control contact is positioned between said top and intermediate contacts and means coupled between said movable contact and said second impedance network to increase the emphasis of said low frequency components with respect to said medium frequency components when said movable gain control contact is positioned between said intermediate fixed contact and said bottom contact.

2. A circuit arrangement for amplifying an input signal having high, medium and low frequency components, comprising an amplifier stage having an input circuit and means to apply said signal to said input circuit and to vary the amplitude thereof, said means also varying the relative strength of said frequency components and comprising a potentiometer element having top, bottom and intermediate fixed contacts and a movable gain control contact, means to apply said signal between said top and bottom contacts, means to couple said movable contact and said bottom contact to said input circuit thereby to apply said signal to said input circuit, a first impedance network adapted to pass said high frequency components inter-coupling said top and movable contacts thereby to emphasize said high frequency components with respect to said medium frequency components for positions of said movable gain control contact between said top and bottom contacts, a second impedance network adapted to by-pass said high and medium frequency components intercoupling said intermediate fixed contact and said bottom contact thereby to emphasize said low frequency components when said movable gain control contact is positioned between said top and intermediate contacts and means to increase the emphasis of said low frequency components with respect to said medium frequency components when said movable gain control contact is positioned between said intermediate fixed contact and said bottom contact comprising a resistance element interconnecting said second impedance network and said movable contact.

3. A circuit arrangement for amplifying an input signal having high, medium and low frequency components, comprising an amplifier stage having an input circuit, and means to apply said signal to said input circuit and to vary the amplitude thereof, said means also varying the relative strength of said frequency components and comprising a potentiometer element having top, bottom and intermediate fixed contacts and a movable gain control contact, means to apply said signal between said top and bottom contacts, means to couple said movable contact and said bottom contact to said input circuit thereby to apply said signal to said input circuit, a first impedance network adapted to pass said high frequency components intercoupling said top and movable contacts thereby to emphasize said high frequency components with respect to said medium frequency components for positions of said movable gain control contact between said top and bottom contacts, a second impedance network adapted to by-pass said high and medium frequency components and comprising a first resistance element and a capacitive element connected in series, said series combination intercoupling said intermediate fixed contact and said bottom contact thereby to emphasize said low frequency components when said movable gain control contact is positioned between said top and intermediate contacts and means to increase the emphasis of said low frequency components with respect to said medium frequency components when said movable gain control contact is positioned between said intermediate fixed contact and said bottom contact comprising a second resistance element interconnecting the junction of said first resistance element and said capacitive element and said movable contact.

HENRICUS ADRIANUS BROOS.

References Cited in the file of this patent

UNITED STATES PATENTS

| Number | Name | Date |
|---|---|---|
| 1,997,762 | Bierwirth | Apr. 16, 1935 |
| 2,037,753 | Barton | Apr. 21, 1936 |
| 2,037,842 | Wolff | Apr. 21, 1936 |
| 2,043,161 | Foster | June 2, 1936 |
| 2,317,025 | Bond | Apr. 20, 1943 |
| 2,322,558 | Bachman | June 22, 1943 |
| 2,352,931 | Austin | July 4, 1944 |
| 2,361,602 | Clark | Oct. 31, 1944 |
| 2,544,344 | Miner | Mar. 6, 1951 |